United States Patent Office 3,764,498
Patented Oct. 9, 1973

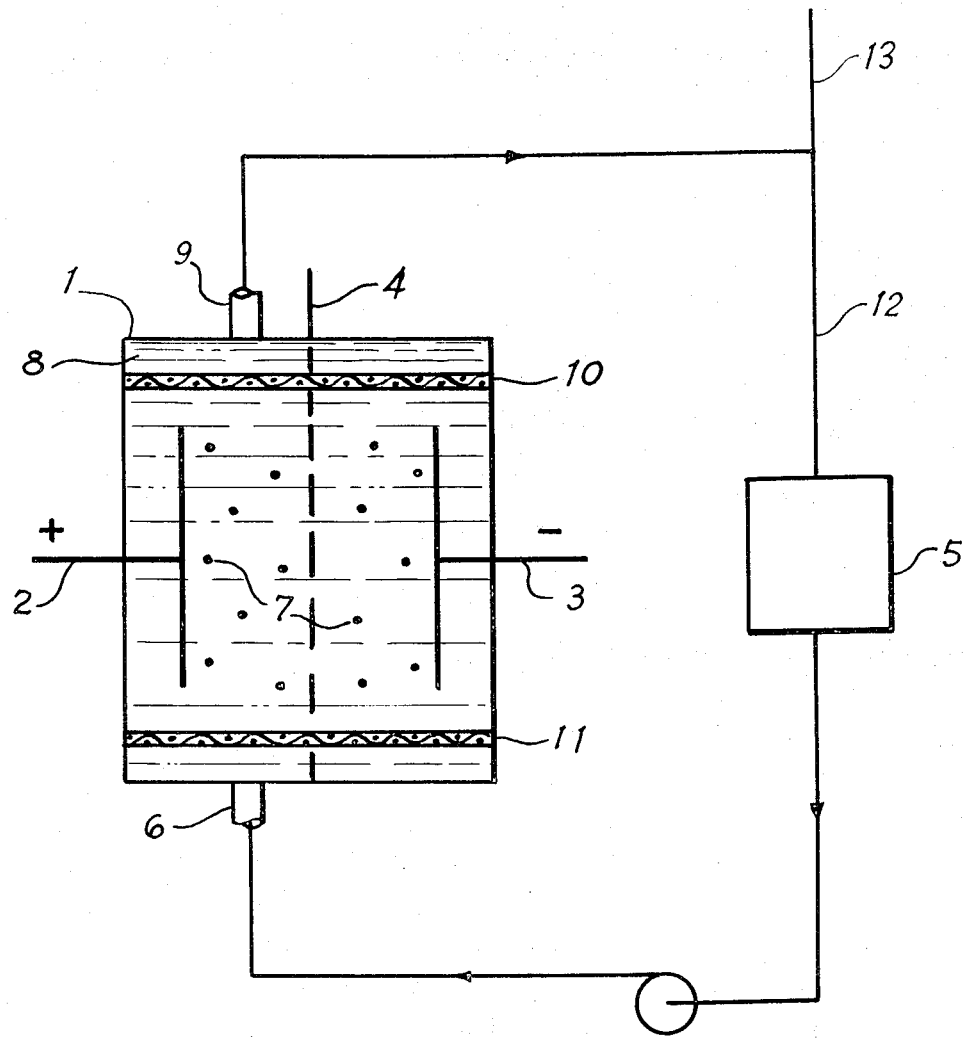

3,764,498
DECREASING CYANIDE CONTENT BY AN ELECTROCHEMICAL TECHNIQUE
Michael Tarianyi, North Tonawanda, and Murray P. Strier, Amherst, N.Y., assignors to Hooker Chemical Corporation, Niagara Falls, N.Y.
Filed Apr. 14, 1971, Ser. No. 133,928
Int. Cl. B01k 3/00; C02c 5/12
U.S. Cl. 204—149
17 Claims

ABSTRACT OF THE DISCLOSURE

A method of decreasing the amount of cyanide ions in a solution comprising passing a current through an electrolytic cell containing at least one positive and one negative electrode therein and having an electrolyte containing cyanide ions and a bed of particles wherein the particles are distributed such that the porosity of the bed ranges from about 40% to about 80% and porosity is defined as $$\left(1 - \frac{\text{volume of particles}}{\text{volume of the cell wherein the particles are distributed}}\right) \times 100$$

BACKGROUND OF THE INVENTION

In the metal plating industry various cyanide containing plating baths are employed whereby effluent containing cyanide ions poses a significant pollution problem. Previously, metal plating effluents containing cyanide ions were treated chemically by the addition of caustic and chlorine so that the cyanide would be oxidized to cyanates and then to carbon dioxide and nitrogen at a pH of about 11 to 12. An electrochemical technique has also been described where a semi-conductive bed of solid particles is used to oxidize the cyanide ions to non-toxic forms such as carbon dioxide and nitrogen. See Belgium Pat. 739,684.

The difficulty of the above processes for decreasing cyanide content of metal plating effluents was either that the product contained significant amounts of additional undesirable chemicals or the performance of electrochemical systems required the use of an inefficient and uneconomical system, which required frequent changing of the bed of particles.

SUMMARY OF THE INVENTION

A method is described for decreasing the amount of cyanide ions in a solution by treating a cyanide containing electrolyte by passing a current through an electrolytic cell containing at least one positive and one negative electrode therein and an electrolyte containing a bed of particles distributed such that the porosity of the bed ranges from about 40 to about 80 percent where porosity is defined as $$\left(1 - \frac{\text{volume of particles}}{\text{volume of the cell wherein the particles are distributed}}\right) \times 100$$

DESCRIPTION OF PREFERRED EMBODIMENTS

The case is directed to a simplified electrochemical technique for decreasing cyanide ions. Preferably, the case is directed to a method for decreasing the amount of cyanide ions in a solution comprising passing a current through an electrolytic cell containing at least one positive and one negative electrode and having an electrolyte containing cyanide ions and a bed of particles wherein the particles are distributed such that the porosity of the bed ranges from about 40 percent to about 80 percent where porosity is defined as $$\left(1 - \frac{\text{volume of particles}}{\text{volume of cell wherein the particles are distributed}}\right) \times 100$$

By determining the density of particles and weighing them, "volume of the particles" in the above porosity formula is substituted with the value for weight of the particles divided by the density of particles. The density of the particles can be measured by introducing an amount of particles into a 1 liter vessel and weighing the vessel. Then an electrolyte is measured as it is passed into the vessel to fill the voids. True density of the particles in grams/cm.$^3$ is the weight of the particles in grams after subtracting from the total weight of the vessel that amount resulting from the weight of the vessel and the weight of the electrolyte divided by true volume of the particle. True volume is the bulk volume minus the volume of the voids in the particle bed. The latter is the volume of the electrolyte poured into the one liter vessel. Therefore true volume of the particles here is 1000 cc. minus the volume of the voids (volume of electrolyte in vessel).

The density of the particles will accordingly vary with the porosity of the particles such as graphite, vis à vis, glass as well as with the electrolyte used because surface tension will vary with the electrolyte.

When porosity ranges are as described above, the density of the particles is measured in an aqueous system, i.e., 100% water. Therefore the above porosity formula can be expressed as:

$$\left(1 - \frac{\frac{\text{weight of particles in electrolyte}}{\text{density of particles in water}}}{\text{volume of cell wherein the particles are distributed}}\right) \times 100$$

Generally, the particles are dispersed or distributed by the flow of electrolyte through the electrode area.

While applicant does not wish to be restricted by a theory to the operability of his invention, the use of particles in an electrolyte cell has the following advantages. In a normal electrolytic cell, the amount of electrode surface for conducting the electrolytic reaction such as in a chlor alkali cell is dependent upon the surface area of the electrodes. Normally, this surface area is about $1.3 \times 10^5$ cm.$^2$ where the cell volume can be $3.5 \times 10^6$ cm.$^3$ resulting in an area per volume ratio of 0.037 (centimeters$^2$/centimeters$^3$). The use of the particles in an electrolytic reaction significantly increases the surface area for the electrolytic reaction to occur. It has been described in Chemical and Process Engineering, February 1968, page 93, that the electrode area in an electrolyte that has particles therein has an electrode area of about 11,500 cm.$^2$ and a cell volume of 153 cm.$^3$ resulting in a area to volume ratio of 75 cm.$^2$/cm.$^3$. Clearly, this is significantly higher than that of a chlor alkali cell.

In addition, using particles in an electrochemical reaction may indicate that a mass transport phenomena may be taking place wherein the contact of cyanide ions with the particles and electrodes is dependent upon a number of variable such as the flow of the electrolyte, the particle size, the density of the particles, the type of particles, and the concentration of cyanide ions. Therefore, taking into consideration all of the above variables, it has been found that porosity of the bed of particles is the determining factor wherein porosity is defined above.

Porosity of a bed of particles can be further defined as follows. If one were to introduce a quantity of particles of a particular size and shape into a one liter vessel, so as to fill up the vessel clearly there are voids between the particles and the porosity of the bed of particles can be defined as $$1 - \frac{\text{volume of particles, cc.}}{1000 \text{ cc.}}$$

If the same amount of particles were disbursed by the flow of electrolyte such that the volume of the bed reached two liters, then the porosity of the bed of particles is expressed as $$1 - \frac{\text{volume of particles, cc.}}{2000 \text{ cc.}}$$

Clearly, the porosity has increased in the second situation.

While the bed porosity may range from about 40% to about 80%, a preferred range is from about 55% to about 75% and even more preferably from about 60% to about 70%. Another preferred range is from about 50% to about 80%.

The invention can be exemplified with reference to the figure which is a schematic diagram of an electrolytic cell of this invention. In the figure, an electrolytic cell 1 has contained therein a positive electrode 2 and a negative electrode 3 which may or may not have a diaphragm 4 between said electrodes. In order to control the concentration of cyanide ions, a source of these ions 5 is maintained separate from the electrolytic cell. The electrolyte is pumped into the electrolytic cell through inlet valve 6. This thereby causes the particles 7 to be distributed in the electrolyte 8. The particles can be distributed randomly throughout the electrolyte depending upon the above parameters such as flow of electrolyte, particle size, particle density, density of electrolyte and the like. The electrolyte exits through outlet 9 for recirculation as desired through line 12 or for subsequent processing through line 13. For convenience, a screen 10 is used to keep the particles at a level generally below the outlet 9 and another screen 11 is generally used to support the particles. As screens 10 and 11 are brought closer together or separated, such as to inlet 6 and outlet 9, the volume of the cell wherein the particles are distributed will vary and therefore the bed porosity will vary providing the particle weight is kept constant.

In general, the electrolyte solution is an aqueous one and preferably it is an effluent from a metal plating bath. This metal plating bath normally contains a number of cations such as zinc or copper as well as anions such as cyanide. The range of cyanide that may be employed in the present invention may be up to about 5 percent cyanide concentration by weight; preferably up to about 5,000 parts per million of cyanide may be employed in the electrolyte. Lower limits of up to 1,000 parts per million cyanide may also be used for introduction into the electrolytic cell with subsequent decrease of the cyanide ions to about 1.0 parts per million after processing.

While the invention is generally applicable to the reduction of cyanide by oxidation, since cyanide goes through various oxidation states resulting in carbon dioxide and nitrogen, the invention is therefore also applicable to the oxidized states of cyanide such as cyanate, cyanogen and cyanogen chloride (ClCN) when the solution also contains chloride ions, and the like.

The electrodes employed in the present process are those that one of ordinary skill in the art would use such as graphite, noble metals and their alloys on base metals, such as, platinum, iridium, ruthenium dioxide on titanium, tantalum and the like; other materials are lead dioxide, manganese dioxide, cobalt, nickel, copper, tungsten bronzes, refractory metal compounds such as nitrides and borides of tantalum, titanium, and zirconium and the like.

The particles to be employed in the present process are generally solid, particulate materials that are conductive, non-conductive or semi-conductive. By conductive is meant that the material which the particle is made of, will normally be considered an electron conducting material. For conductive particles, they may have a metallic surface where this metallic surface is either placed onto non-conductive substrates or the metallic surface is present by virtue of the particle being a particular type metal. In addition, the conductive particles may be electronically conductive metal compounds, such as, carbides, borides, or nitrides of tantalum, titanium, and zirconium or metal oxides such as lead dioxide, ruthenium dioxide and the like. Various metals may be employed such as metals of Periodic Table Group VIII, specifically such as ruthenium, iridium and platinum, or other conductive materials, such as copper, silver, zinc, graphite and the like. When the particles are non-conductive materials, the particles may be made of substances such as inert substances in particular glass. Teflon® coated glass, polystyrene spheres, fly ash, sand, ferrophos and plastic spheres and chips and the like.

The particles may range in size from about 5 to about 5,000 microns, preferably 50 to about 2,000 microns and even more preferably about 100 to 800 microns. Other ranges may be used such as 50 to about 1,000 or 50 to about 500 in order to achieve a desired result such as lower power requirements or difficulty in obtaining a relatively narrow range of size for a particular material.

The density of the particles should be such that in conjunction with the size and shape of the particle it will provide the proper balance between the drag force created by the electrolyte motion and the buoyancy and gravitational forces required to achieve particle dispersion at the desired porosity. Accordingly, the particle density may range from about 0.1 (less than the density of electrolyte) to about 1.0 gram per cc. when the particle dispersion is established against or in opposition to the buoyancy force. Alternatively, when the particle dispersion is achieved against or in opposition to the gravitational force the density of the particles should range from about 1.1 to 10 grams per cc., preferably about 1.5 to about 3.5 grams per cc.

The preferred circumstances are when the particles are dispersed throughout the electrolyte during the movement of the electrolyte and the particles are more dense than the electrolyte.

The flow of the electrolyte through the electrode area is dependent upon the electrode separation, the particle size and the particle density. Normally, the flow is described in terms of linear flow velocity of the electrolyte. It is preferred that the flow velocity range from about 0.1 centimeter per second to about 1000 centimeters per second, preferably from about 0.1 to about 100 centimeters per second and even more preferably about 0.1 to about 10 cm./sec.

The positive and negative electrodes should be separated so as to admit sufficient flow of the electrolyte and movement of the particles therein. As the electrodes are separated, the voltage required to produce a desired result increases. The electrodes are separated from about 0.1 cm. to about 5.0 cm., preferably 0.5 to about 3 centimeters, and even more preferably about 0.5 cm. to about 2 cm. For convenience in handling large volumes of liquid, a plurality of electrode pairs may be formed in normal large scale electrolytic continuous processing techniques.

In the oxidation of cyanide ions, it is preferred that no diaphragm be employed in the cell. However, a diaphragm could be used to control the particles in either the anolyte or catholyte or both chambers such as a Teflon® coated screen, etc.

For cyanide oxidation, it is preferred that the pH be on the basic side, preferably about 8 to about 14 and even more preferably from about 9 to about 13.

The temperature of the electrolysis can vary from about 0 to 100 degrees centigrade. In other words, the reaction temperature is such that the electrolyte will remain a liquid. For economic reasons, it is preferred that the temperature be ambient. Also for economic reasons, it is preferred that no pressure be employed and that the pressure used be atmospheric.

The current density used ranges from about 1.0 milliamp/cm.$^2$ to about 500 milliamp/cm.$^2$.

Having described in general applicant's invention, below are examples to further illustrate the invention. All temperatures are in degrees centigrade and all concentrations are parts by weight.

troduced into the electrode chamber, the 700 cc. test solution was added to the cell and reservoir circuits. The test solution was circulated through the system for 15 minutes. A 50 cc. sample was removed for measurement of initial cyanide content, copper contents and pH. Enough voltage was applied in order to maintain a constant current density of 15 ma./cm.$^2$ as the test solution was continuously recirculated through the electrolysis cell at the required flow rate. The voltage was read at one minute intervals. After each 10 minute electrolysis period a 50 cc. sample was withdrawn for cyanide measurement and then returned to the cell. The electrolysis was continued until the cyanide content was reduced to at least 0.5 part per million. The copper content was determined after the desired level of cyanide content had been reduced. The results are tabulated in Table I.

TABLE I

Reduction of CN− concentration from 200 p.p.m. to 0.5 p.p.m.

| Experiment number | Particles (size district) in microns | Particle weight g. | Porosity, percent | Flow rate, cc./min. | Flow velocity, cm./sec. | Energy expended, watt/min. |
|---|---|---|---|---|---|---|
| 1.35 cm. electrode separation | | | | | | |
| A | Graphite (840–2000) | 96.0 | 60 | 642 | 1.2 | 280 |
| B | do | 77.0 | 67 | 1,145 | 2.1 | 273 |
| C | Graphite (590–840) | 96.0 | 60 | 89 | 0.1 | 490 |
| D | do | 77.0 | 70 | 351 | 0.7 | 420 |
| E | Glass (500) | 153.5 | 55 | 1,250 | 2.7 | 580 |
| F | do | 119.5 | 65 | 1,750 | 3.3 | 520 |
| G | None | | | 54 | 0.1 | 680 |
| H | do | | | 351 | 0.7 | 610 |
| I | do | | | 642 | 1.2 | 645 |
| J | do | | | 1,390 | 2.6 | 350 |
| K | do | | | 1,750 | 3.3 | 498 |
| 0.40 cm. electrode separation | | | | | | |
| L | Graphite (590–840) | 22.8 | 60 | 16 | 0.1 | 348 |
| M | do | 22.8 | 70 | 117 | 0.7 | 310 |
| N | Glass (500) | 45.5 | 55 | 505 | 3.2 | 298 |
| O | do | 35.3 | 65 | 568 | 3.6 | 218 |
| P | None | | | 16 | 0.1 | 578 |
| Q | do | | | 117 | 0.7 | 527 |

EXAMPLE 1

Experimental procedure

An electrolytic cell was constructed similar to FIG. 1 with no diaphragm. The negative electrode was a nickel metal while the positive electrode was made of graphite. An amount of solid particles (conductive or non-conductive as described below) is introduced into the electrode chamber forming a bed of particles. The particles are supported by a porous screen through which electrolyte is pumped to effect particle distribution. The cell was connected to a closed electrolyte circuit consisting of a 1.0 liter reservoir and a circulating pump which maintained the electrolyte circulation through the cell at the appropriate flow rate for a particular bed porosity. Characteristics of the particles used were as follows:

(A) Conductive—graphite with a particle size of 590 to 840 microns and specific gravity 1.9 grams per cc. and graphite with a particle size of 840 to 2,000 microns and a true density of 1.9 grams/cc.

(B) Non-Conductive—glass beads: particle size of about 500 microns; a true density of 2.5 grams per cc.

In all experiments, the weight of particles charged into this cell was governed by the experimental conditions such as a type of particles, electrode separation and electrolyte flow rate. Stock solutions for electrochemical testing were prepared for a typical plating bath effluent and had the following ion concentration; cyanide, 200 parts per million, Cu$^{++}$, 140 parts per million; potassium hydroxide, 0.56 percent. A total volume of each test solution was 700 cc. The pH of the solution is 12.5. All experiments were carried out at constant current density of 15 ma./cm.$^2$.

After the appropriate amount of particles has been in-

The above indicates that less electrochemical energy is required as the flow velocity is increased. Graphite particles are distinctly advantageous over a system without particles at equivalent flow rates and an electrode separation of 1.35 centimeters. This effect is likewise shown at 0.4 centimeter electrode separation. At 1.35 centimeter electrode separation, the insulating effect of glass beads increases the energy requirements. This should be contrasted with the decided advantage of glass beads at an electrode separation of 0.4 centimeter.

The overall comments on the above are that without particles, energy requirements decrease with increasing flow velocity and decreasing electrode separation. Graphite particles at both distances of electrode separation and glass particles at the 0.4 centimeter electrode separation afford decreasing energy requirements with increasing flow velocity.

It has been found that the copper content has been reduced from 140 parts per million to about 5 to 40 parts per million during the above test. Removal of copper was due to the electrochemical reduction of copper (1) to the metal. Deposits of metallic copper were obtained at the cathode at the conclusion of the electrolysis experiments. The pH of the solution remains substantially unchanged during electrolysis.

EXAMPLE 2

In a procedure similar to Example 1, a solution of 200 parts per million cyanide ion (in form of KCN) was prepared having a pH of 10.9. Graphite particles of 590 to 840 microns in size and a bed porosity of 70 percent with a 0.4 centimeter electrode separation was conducted with amprerage of 15 ma./cm.$^2$. In another experiment, with glass beads, the pH of the solution was increased to about 13 by the addition of KOH. The results are tabulated in Table II.

TABLE II

Reduction of CN⁻ concentration from 200 p.p.m. to 0.5 p.p.m.[1]

| Expanded number | Particles (size distribution) | Particle weight, g. | Porosity, percent | Flow rate, cc./min. | Flow velocity, cm./sec. | Energy expended watt-min. |
|---|---|---|---|---|---|---|
| | | 0.4 cm. electrode separation | | | | |
| | Copper plating bath solution | | | | | |
| 2A[2] | Graphite (590–840) | 22.8 | 70 | 117 | 0.7 | 300 |
| 2B | Glass (500) | 45.5 | 55 | 505 | 3.2 | 250 |
| | Zinc plating bath solution | | | | | |
| 3C | Graphite (590–840) | 22.8 | 70 | 117 | 0.7 | 390 |
| 3D | Glass (500) | 45.5 | 55 | 505 | 3.2 | 295 |

[1] All experiments performed at current density of 15 ma./cm.².
[2] Performed without pH adjustment at pH-10.9.

The energy required for reduction to the 0.5 part per million cyanide level is essentially the same as that described above. The results as shown in Table II compare favorably with the solution used in Table I.

EXAMPLE 3

Zinc cyanide plating bath solution

Using a composition of 4.5 oz. per gallon of zinc metal; 12.0 oz. per gallon of sodium cyanide and 7 oz. per gallon of sodium hydroxide, this solution was diluted to 200 parts per million for the cyanide ion whereupon the pH of this solution was 11.4. The pH was adjusted to 12.8 by the addition of sodium hydroxide. Electrolysis experiments with graphite and glass beads were performed under the conditions described for the copper plating bath solution of Example 2. The results are likewise summarized in Table II.

EXAMPLE 4

Using a composition of 4.5 oz. per gallon of zinc metal: 12 oz. per gallon of sodium cyanide and 7 oz. per gallon of sodium hydroxide. This solution was diluted to 16,000 parts per million for cyanide whereupon the pH of this solution was 12.7 without addition of any sodium hydroxide. Electrolysis with glass beads at 67% porosity with graphite anode and stainless steel cathode as feeder electrodes were performed at constant current density of 30.0 ma./cm.² and at otherwise similar conditions as described in Example 2. As a result of electrolysis the cyanide concentration was reduced from 16,000 parts per million to less than 0.5 part per million while simultaneously the zinc concentration was reduced from 11,266 parts per million to 21 parts per million.

What is claimed is:

1. A method of decreasing the amount of cyanide ions in a solution which comprises passing electric current through a solution containing cyanide ions, which solution is contained as an electrolyte in a cell, said cell having at least one positive and one negative electrode between which the current is passed, and wherein the electrolyte also contains a bed of dispersed particles, distributed therein such that the porosity of the bed is from about 40 to 80%, porosity being defined as:

$$\left(1 - \frac{\text{volume of particles}}{\text{volume of cell wherein the particles are distributed}}\right) \times 100$$

and oxidizing a substantial amount of the cyanide ions in the solution to carbon dioxide, and nitrogen.

2. The method of claim 1 wherein the electrolyte is passed into the electrolytic cell against gravitational forces thereby distributing the particles.

3. The method of claim 1 wherein the electrolyte is an aqueous electrolyte.

4. The method of claim 1 wherein the concentration of the cyanide ions prior to the passing of the current may be up to 5% by weight.

5. The method of claim 4 wherein the concentration may be up to 5000 parts per million.

6. The method of claim 1 wherein particles have a density greater than that of the electrolyte.

7. The method of claim 1 wherein the particles are conductive particles.

8. The method of claim 1 wherein the particles are graphite.

9. The method of claim 1 wherein the particle have a metallic surface.

10. The method of claim 1 wherein the electrolyte flow velocity ranges from about 0.1 to about 1000 cm./sec.

11. The method of claim 1 wherein the cell has a diaphragm between the positive and negative electrode.

12. The method of claim 1 wherein the cell has no diaphragm between the electrodes.

13. The method of claim 1 wherein the temperature ranges from about 0° C. to about 100° C.

14. The method of claim 1 wherein the pH of the electrolyte ranges from about 8 to about 14.

15. The method of claim 1 wherein the porosity ranges from about 50% to about 80%.

16. The method of claim 1 wherein the positive and negative electrodes are separated a distance of from about 0.1 cm. to about 5.0 cm.

17. The method of claim 1 wherein the density of the particles is less than 1.0 gram/cc.

References Cited

UNITED STATES PATENTS

| 543,673 | 7/1895 | Crawford | 204—110 X |
| 698,292 | 4/1902 | Kendall | 204—110 |
| 2,737,298 | 3/1956 | Hendel | 210—149 |
| 2,773,025 | 12/1956 | Ricks et al. | 204—149 |
| 3,457,152 | 7/1969 | Maloney, Jr. et al. | 204—131 |
| 3,616,356 | 10/1971 | Roy | 204—152 |

FOREIGN PATENTS

| 1,500,269 | 9/1967 | France | 204—DIG. 10 |
| 1,584,158 | 12/1969 | France | 204—DIG. 10 |

OTHER REFERENCES

Le Goff et al., "Applications of Fluidized Beds in Electrochem.," Indust. & Engin. Chem., vol. 61, No. 10, October 1969, pp. 8–17.

Thangappan et al., "Copper Electroforming in Fluidized Bed," Metal Finishing, December 1971, pp. 43–49.

JOHN H. MACK, Primary Examiner

A. C. PRESCOTT, Assistant Examiner

U.S. Cl. X.R.

204—130, DIG. 10

PO-1050
(5/69)

UNITED STATES PATENT OFFICE
CERTIFICATE OF CORRECTION

Patent No. 3,764,498          Dated    October 9, 1973

Inventor(s) Michael Tarjanyi et al

It is certified that error appears in the above-identified patent and that said Letters Patent are hereby corrected as shown below:

Column 1, in the heading "Michael Tarianyi" should read ---Michael Tarjanyi---; Column 2, line 65, "of variable" should read ---of variables---; Column 6, line 17 "been reduced" should read ---been reached---, Table I, in the heading of the second column, "(size district)" should read ---(size dist.)---, line 53 "coments" should read ---comments---; Column 8, Claim 9, "the particle" should read ---the particles---.

Signed and sealed this 26th day of February 1974.

(SEAL)
Attest:

EDWARD M. FLETCHER, JR.        C. MARSHALL DANN
Attesting Officer              Commissioner of Patents